United States Patent [19]

Barree

[11] Patent Number: 4,776,618

[45] Date of Patent: Oct. 11, 1988

[54] HIGH PRESSURE COUPLING

[75] Inventor: Robert D. Barree, Littleton, Colo.

[73] Assignee: Marathon Oil Company, Findlay, Ohio

[21] Appl. No.: 85,911

[22] Filed: Aug. 14, 1987

[51] Int. Cl.$^4$ .............................................. F16L 21/04
[52] U.S. Cl. ................................... 285/341; 285/342; 285/346; 285/348; 285/356
[58] Field of Search ............... 285/341, 348, 346, 342, 285/353, 356, 384, 389

[56] References Cited

U.S. PATENT DOCUMENTS

| | | | |
|---|---|---|---|
| 1,694,822 | 12/1928 | Kennedy | 285/348 X |
| 2,300,584 | 11/1942 | Martin | 285/341 X |
| 2,394,351 | 2/1946 | Wurzburger . | |
| 2,463,707 | 3/1949 | Matousek . | |
| 3,186,743 | 6/1965 | Russell, Jr. | 285/353 X |
| 3,437,357 | 4/1969 | Rubin | 285/342 X |
| 3,584,900 | 6/1971 | Lennon | 285/341 X |
| 3,591,208 | 7/1971 | Nicolaus . | |
| 3,880,452 | 4/1975 | Fields | 285/341 X |
| 3,973,792 | 8/1976 | Gönner | 285/341 |
| 4,138,145 | 2/1979 | Lawrence . | |
| 4,281,679 | 8/1981 | Stearns | 285/353 X |
| 4,291,903 | 9/1981 | Fields | 285/354 X |
| 4,541,537 | 7/1985 | Sailor . | |
| 4,602,809 | 7/1986 | Ross et al. | 285/354 X |

FOREIGN PATENT DOCUMENTS 973290  1/1960  Fed. Rep. of Germany ...... 285/342

*Primary Examiner*—Randolph A. Reese
*Assistant Examiner*—Anthony Knight
*Attorney, Agent, or Firm*—Jack L. Hummel; Rodney F. Brown

[57] ABSTRACT

A high-pressure coupling for small-diameter pipe is obtained with standard male and female pipe connectors, three ferrules, an O-ring and a flat metallic washer disposed around the pipe and designed such that when the connectors are hand tightened, the coupling compresses the ferrules, O-ring and flat washer to obtain a coupling that will withstand pressures up to 10,000 psi.

3 Claims, 2 Drawing Sheets

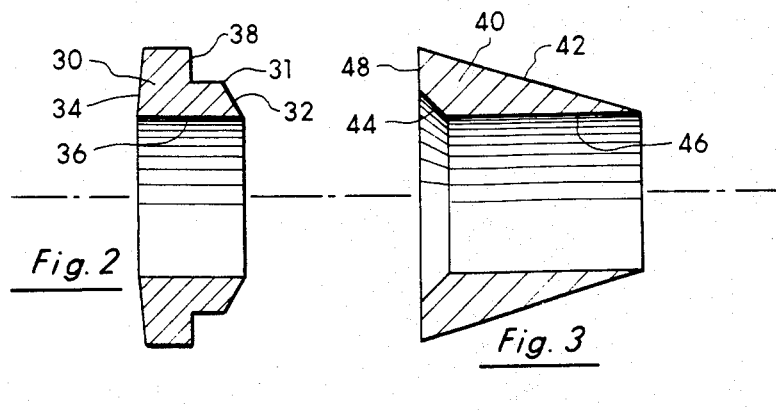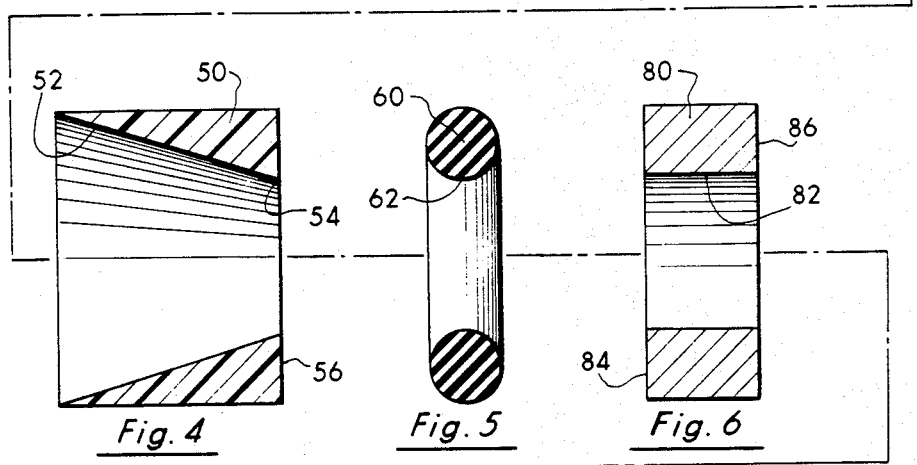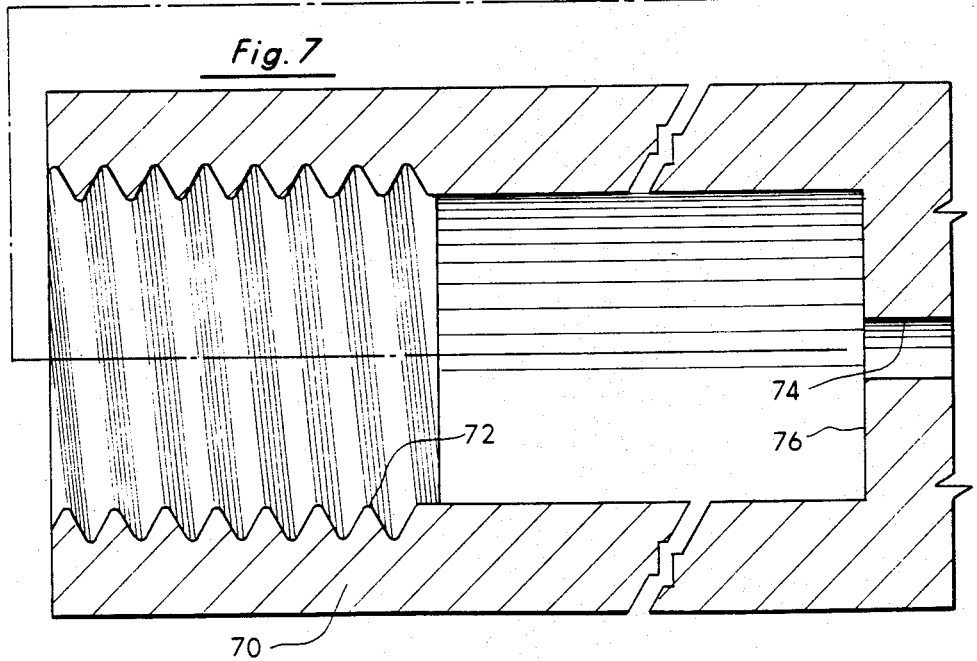

HIGH PRESSURE COUPLING

BACKGROUND OF THE INVENTION

1. Technical Field

This invention is a high-pressure coupling useful for smalldiameter pipe operated at pressures up to and in excess of 10,000 pounds per square inch. The coupling can be tightened by hand.

2. Background Information

Coupling devices made out of metal and consisting of a threaded nut, one or more ferrules and a male connector have been used to connect high-pressure pipe. Examples of such couplings include Swagelock ® fittings manufactured by Crawford Fitting Co., 29500 Solon Road, Solon, Ohio 44139. More specifically a Swagelock nut, a Swagelock back ferrule, a Swagelock front ferrule and a Swagelock body are assembled and fitted to a pipe and tightened by wrench for high-pressure use. Repeated use of such fittings tend to wear the metal parts, causing scarring of the faces of the ferrules, etc., which can result in leaking. That is, upon repeated tightening and loosening with a wrench, the ferrules, etc., become scarred or worn which result in inefficient coupling for high pressure applications. Other types of fittings which have similar problems include Cajon ® coversion fittings, Cajon Company, 7960 Shepherd Road, Macedonia, Ohio 44056; Sno-Trik ®fittings, Sno-Trik Company, Cleveland, Ohio; Parker Fittings, Parker Hannifin Company, Cleveland, Ohio; Valco Fittings, Valco, Inc., Houston, Tex.; and National Bureau of Standards Fittings (NBS) made by Autoclave Engineers, Erie, Pa.; and HIP, Inc., Erie, Pa.

SUMMARY OF THE INVENTION

Applicant's high-pressure coupling is obtained by adding a reverse cone ferrule made of a relatively pliable material to an existing Swagelock ® fitting comprised of a flat female and a conical male ferrule and thereafter placing a pliable O-ring against the flat surface of the reverse cone ferrule and a flat metallic washer on the other side of the O-ring. The ferrules are compressed so they are "locked" onto a section of pipe at a specific distance from the pipe end. The angle of the cone of the reverse cone ferrule is at the same angle as the conical surface of the conical male ferrule. A standard size O-ring is placed over the pipe and contiguous to the square or flat end of the reverse cone ferrule and a flat metallic ring is placed over the pipe and against the O-ring. Thereafter the assembly is screwed into a female nut to complete the coupling. The flat metallic ring axially and dynamically loads the O-ring and compresses the ferrules. The coupling can be hand tightened and effect a seal useful at pressures up to and in excess of 10,000 psi.

This coupling provides advantages over the prior art couplings in that (1) the coupling can be hand-tightened to effect a high-pressure seal, (2) only the pipe, O-ring and washer are wetted by the fluid, (3) only the O-ring wears out during repeated use, and (4) excessive extrusion of the O-ring to cause leakage is minimized by the tapered backup ferrule assembly.

BRIEF DESCRIPTION OF THE DRAWINGS

The pipe coupling defined herein can be reused without adversely affecting the sealing properties of the metal parts of the coupling. The only part of the coupling that may change due to wear is the O-ring. Also, the coupling can be hand tightened to withstand pressures up to and in excess of 10,000 psi, i.e., a mechanical tool is not needed to tighten the coupling.

The invention will now be described by reference to the accompanying drawings, in which:

FIG. 2 is a cross-sectional view of a first ferrule.

FIG. 3 is a cross-sectional view of a second ferrule having an external wedge or conical surface.

FIG. 4 is a cross-sectional view of a third ferrule having an internal wedge or reverse conical surface and a flat end surface.

FIG. 5 is a cross-sectional view of an O-ring.

FIG. 6 is a cross-sectional view of a flat metallic washer.

FIGS. 7 is a cross-sectional view of a threaded coupling nut.

DESCRIPTION OF THE PREFERRED EMBODIMENTS

Figure 1:
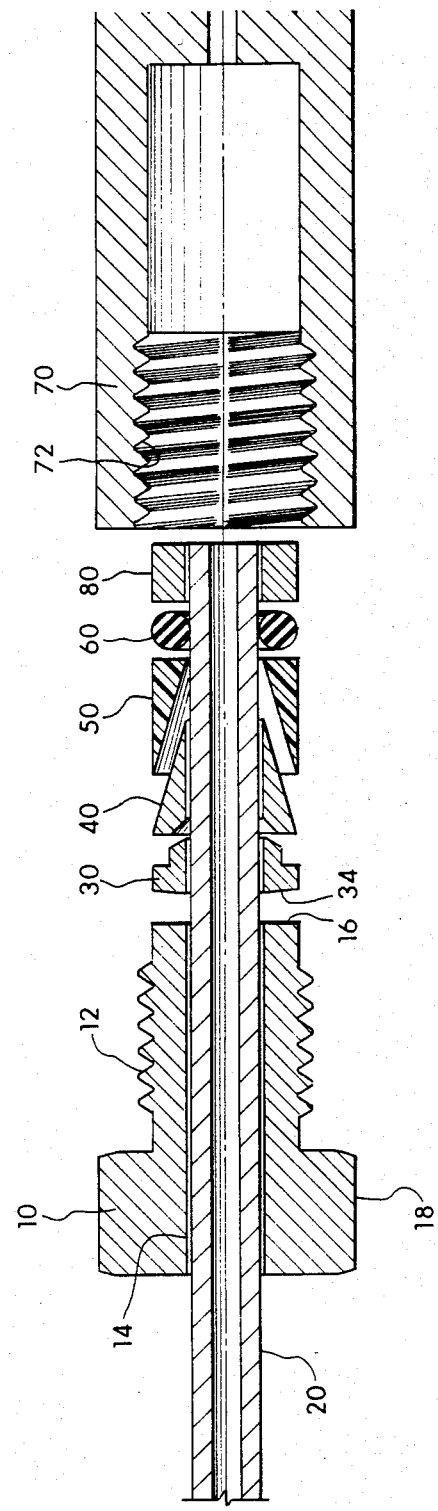
FIG. 1 is a cross-sectional view of a coupling.

The body 10 preferably has flat portions 18 on the rear outside perimeter of the body to provide means for tightening the body. That is, a nut-like perimeter is provided on the body for hand tightening. Threads 12 on the body are designed to engage a companion threaded coupling nut 70. The body 10 has a bore 14 designed to fit snugly around pipe 20. The front portion 16 of the body 10 is designed to be flat and flush against the rear surface 32 of first ferrule 30.

FIG. 2 shows first ferrule 30. The ferrule has a flat surface 34 designed to fit flush against the flat surface 16 of body 10. Bore 36 of the ferrule is designed to fit snugly around the pipe 20. The ferrule has an external wedge surface 32, the base portion 31 of the wedge is designed to fit flush against internal wedge surface 44 of second ferrule 40. The inside flat surface 38 is designed to fit flush against flat surface 48 of second ferrule 40 when the external wedge surface 32 and the internal wedge surface 44 are contiguous.

Second ferrule 40 has an internal wedge surface 44 designed to fit contiguously against the circular base edge 31 of surface 32 of the first ferrule 30. The angle of the internal wedge surface 44 is less than the angle of the external wedge surface 32. Bore 46 is designed to fit snugly around the pipe 20. External wedge surface 42 is designed to fit flush against and mate with the internal wedge surface 52 of third ferrule 50.

Third ferrule 50 has an internal wedge surface 52 and a base or flat surface 56. The angle of the internal wedge surface 52 is identical to or about the same angle as the external wedge surface 42 of the second ferrule 40. The bore 54 is designed to fit snugly around the pipe 20.

O-ring 60 has a circular inside surface 62 which has an inside diameter equal to or slightly less than the outside diameter of pipe 20. The O-ring is made of neoprene, Teflon TM material, or other types of pliable synthetic material. The material should not have the property that would permit it to be extruded around the third ferrule when the coupling is tightened. However it should be pliable enough to permit uniform deformation of the O-ring when it is loaded by the flat metallic washer 80.

FIG. 6 shows a flat metallic washer 80. Flat surface 84 is designed to fit flush against the side of O-ring 60 and to uniformly and axially load the O-ring to effect a seal when the coupling is assembled and tightened. Bore 82 is designed to fit snugly around the pipe 20. Surface 86 or a portion thereof is designed to fit flush against surface 76 of nut 70.

FIG. 7 shows a threaded coupling nut 70. Threads 72 are designed to fit companion threads 12 of body 10. Flat surface 76 is designed to fit flush against surface 86 of washer 80. Bore 74 can be a port permitting fluids to flow from pipe 20 through bore 74 to another location. Also, bore 74 can be connected to a pipe or be a pipe. The inside diameter of bore 74 is not critical to the invention and can be of any diameter as long as flat surface 76 fits flush against surface 86 of washer 80.

The outside diameters of ferrules 30, 40 and 50, O-ring 60 and washer 80 are preferably the same or within about 0.1 mm of the same diameter.

The pipe 20 is preferably one having a diameter less than $\frac{1}{4}''$ and more preferably is a pipe having a diameter of $\frac{1}{4}''$, $\frac{1}{8}''$ or 1/16''. Such pipe is typically used with laboratory equipment operated at high pressures.

Examples of metals useful with body 10, ferrules 30, 40 and 50, nut 70 and washer 80 include alloy steel, aluminum alloys, brass, copper-nickel alloys, Hastelloy metals, Inconel 600, monel, nickel, stainless steel 304, 316, 321, 347, carbon steel, tantalum, titanium, zirconium alloys and like materials. Ferrules 30 and 40 and washer 80 are preferably made of 17-4 PH stainless steel, 316 stainless or brass and ferrule 50 is preferably made of nylon, Polyimide, Polysulfone, Kevlar, Peak, Ryton and filled Teflon.

The coupling does not require a wrench to make up and can be hand tightened to permit operation pressures up to and in excess of 10,000 psi.

The O-ring may be replaced after repeated uses. It is the only part of the coupling that will need to be replaced with normal conventional use. The coupling can be reused at high pressures, i.e., disassembled and assembled, without wear of metal-to-metal surfaces and without pressure leakage.

What is claimed is:

1. A high-pressure coupling comprising a body having a male threaded portion and a circular bore within the body thereof to receive a pipe, a first ferrule having a circular bore to receive the pipe and having a flat base portion to fit against the face of the threaded end of the body and a front portion having an external wedge surface, a second ferrule having a circular bore to receive the pipe and having a back portion comprised of an internal wedge surface, which surface is at an angle less than the angle of the external wedge surface of the first ferrule, and having a front portion comprised of an external wedge surface, a third ferrule having a circular bore to receive the pipe and having an internal wedge surface on one end thereof at an angle to mate with the external wedge surface of the second ferrule and having a flat surface on the other end, the third ferrule being made of a material more pliable than the second ferrule, a resilient sealing O-ring having a circular inside diameter equal to or slightly less than the outside diameter of the pipe, a flat metal washer having a circular bore to receive the pipe and having flat surface to fit flush against the O-ring and to uniformly and axially load the O-ring, and a threaded coupling nut designed to engage and mate with the threaded portion of the body and designed to exert sufficient force to compress the ferrules and dynamically load the O-ring to obtain a coupling that will withstand high pressures when the coupling is tightened.

2. The coupling of claim 1 wherein the coupling nut is connected to a pipe.

3. The coupling of claim 1 wherein the third ferrule is made of polyimide.

* * * * *